United States Patent [19]

Schultz et al.

[11] 4,417,838
[45] Nov. 29, 1983

[54] APPARATUS FOR LOADING ARTICLES INTO LANES ON HORIZONTAL SHELVES

[75] Inventors: Charles W. Schultz, Easton, Pa.; James L. Thatcher, Alpha, N.J.

[73] Assignee: SI Handling Systems, Inc., Easton, Pa.

[21] Appl. No.: 219,542

[22] Filed: Dec. 23, 1980

[51] Int. Cl.³ .............................................. B65G 1/04
[52] U.S. Cl. .................................... 414/277; 414/282
[58] Field of Search ................ 414/277, 278, 280–282, 414/659, 257; 187/9 R

[56] References Cited

U.S. PATENT DOCUMENTS 2,746,616  5/1956  Sinclair ................................ 414/257
3,782,563  1/1974  Brockmeyer et al. .......... 414/278 X
4,113,119  9/1978  Brown et al. ........................ 414/281

Primary Examiner—Robert G. Sheridan
Attorney, Agent, or Firm—Seidel, Gonda & Goldhammer

[57] ABSTRACT

The lane loading apparatus includes a wheeled frame reciprocal along the loading end of shelves. The frame supports a main carriage for vertical movement with respect to the shelves. The main carriage supports an auxiliary carriage for reciprocation toward and away from the loading end of the shelves. A lane actuator is supported by the auxiliary carriage for retracting an endless member and associated pusher in a lane to a reloading position.

10 Claims, 6 Drawing Figures

APPARATUS FOR LOADING ARTICLES INTO LANES ON HORIZONTAL SHELVES

BACKGROUND

Apparatus of the general type involved herein is known to those skilled in the art. For example, see U.S. Pat. No. 4,113,119. The apparatus of the present invention provides for improved vertical guidance of a carriage as compared with the apparatus in said patent while at the same time mechanizes various functions performed manually in connection with the apparatus in said patent.

SUMMARY OF THE INVENTION

The apparatus of the present invention comprises a loading frame having a top portion and a bottom portion connected by vertical portions. The frame is provided with wheel means to permit the frame to move horizontally in a first direction. A main carriage has opposite sides supported by the frame for vertical movement. An auxiliary carriage is supported by the main carriage for horizontal movement relative thereto in a second direction. The second direction is perpendicular to said first direction.

A horizontal plate member is supported by the auxiliary carriage for alignment with a shelf. A motor means on one of said carriages is provided for driving a lane actuator on the auxiliary carriage. The lane actuator is adapted to drive an endless member and pusher associated therewith on a shelf lane to a reloading position. Thereafter, the lane may be reloaded by transferring articles off the plate member and onto the shelf aligned therewith.

It is an object of the present invention to provide an improved lane loading apparatus having the various features and advantages as will appear hereinafter.

For the purpose of the illustrating the invention, there is shown in the drawings a form which is presently preferred; it being understood, however, that this invention is not limited to the precise arrangements and instrumentalities shown.

DETAILED DESCRIPTION

Figure 1:
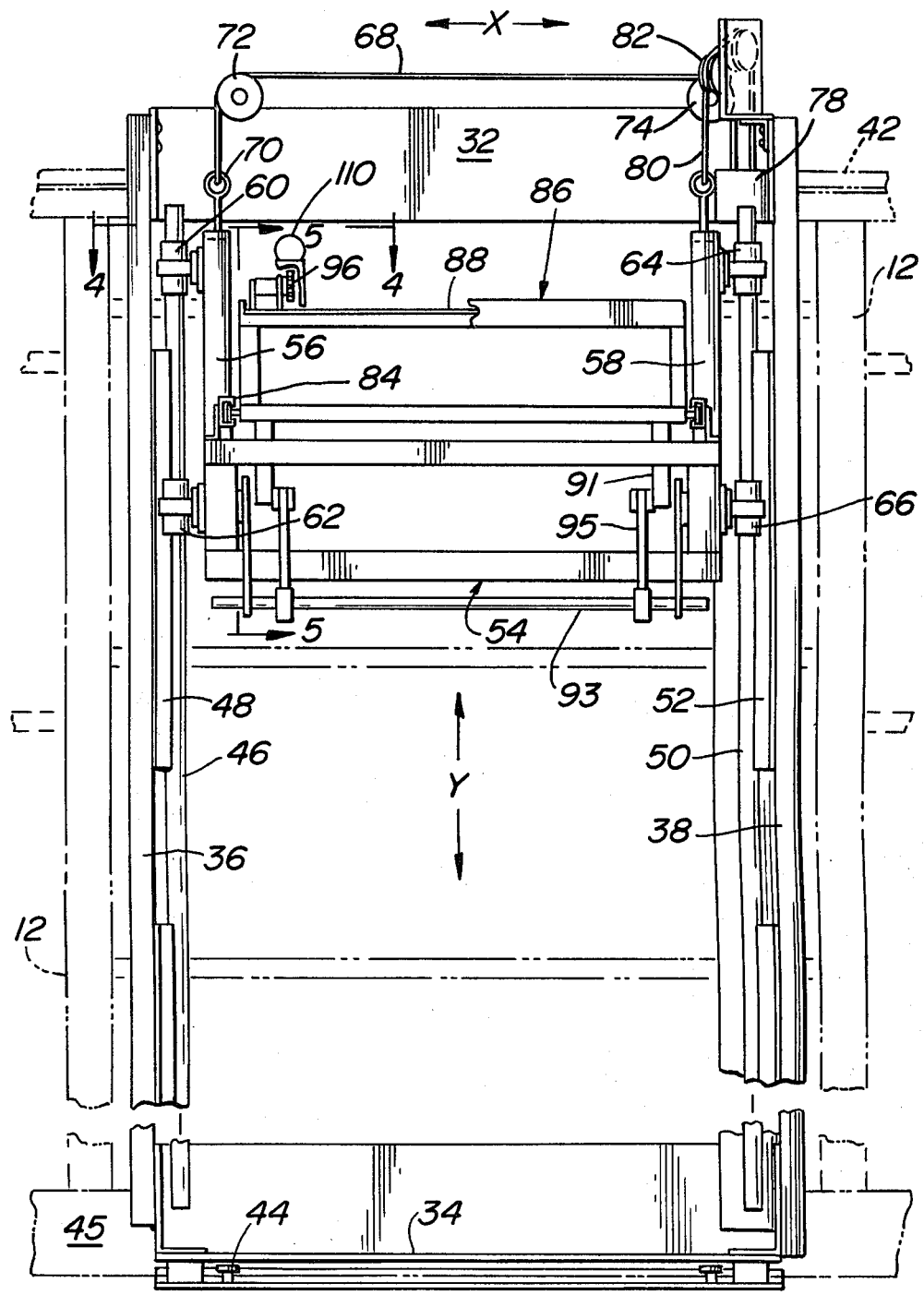
FIG. 1 is a front elevational view of apparatus in accordance with the present invention juxtaposed to a plurality of horizontal shelves.
Figure 3:
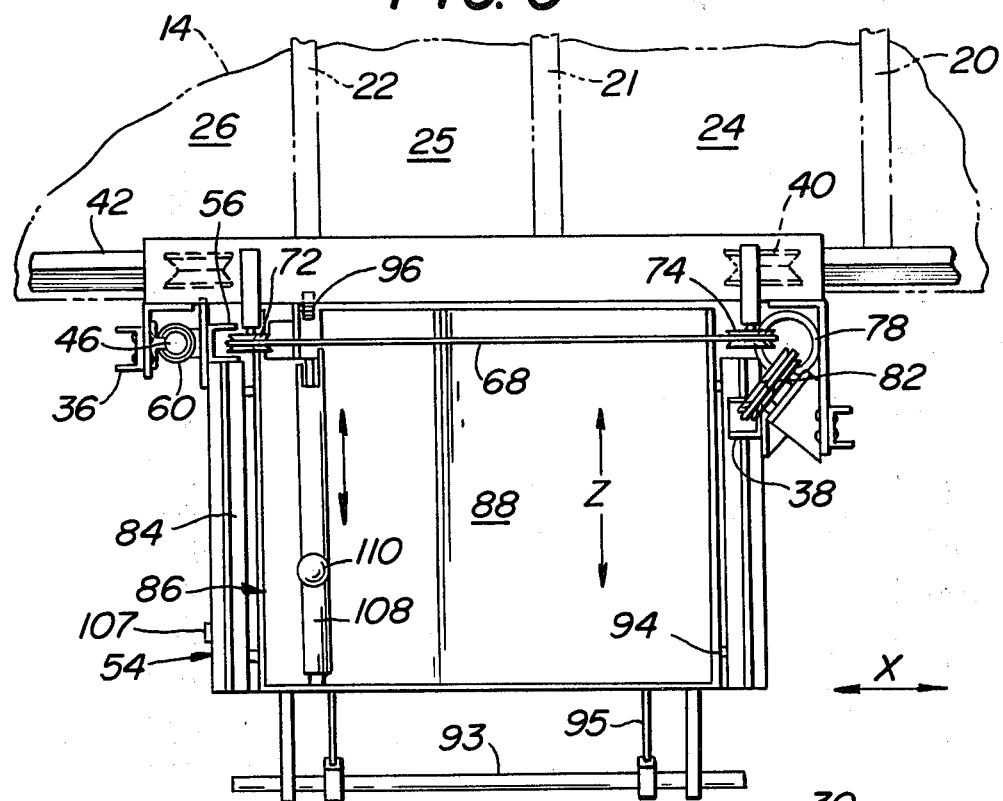
FIG. 3 is a top plan view of the apparatus shown in FIG. 1.

Referring to the drawings in detail, wherein like numerals indicate like elements, there is shown in FIG. 1 a shelf frame designated generally as 12. The frame 12 supports a plurality of horizontally disposed and vertically spaced shelves 14, 16, 18, etc. For purposes of illustration, shelf 14 is chosen as a shelf to be reloaded with articles to be dispensed from an end of the shelf opposite from that shown. As shown more clearly in FIG. 3, shelf 14 has a plurality of lane dividers 20, 21, 22, etc. Dividers 20 and 21 delineate a lane 24 on the shelf 14. Dividers 21 and 22 delineate a lane 25 on the shelf 14. Divider 22 and the next adjacent divider delineate a lane 26 on the shelf 14.

The lane dividers are identical. Only lane divider 22 will be described in detail. Lane divider 22 is a hollow elongated housing removably secured to a top surface of the shelf 14. Within the lane divider, there is provided an endless member such as a cable extending around sprockets at each end. At the reloading end of the lane divider 22, the sprocket is identified by the numeral 28. See FIG. 2. The endless member trained around the sprockets associated with lane divider 22 is connected to a lane pusher 30. Pusher 30 has an upright wall for pushing articles forwardly, that is, from left to right in FIG. 2 toward a discharge end of the shelf 14.

The lane loading apparatus in accordance with the present invention is designated generally as 31. As shown more clearly in FIGS. 1 and 2, the apparatus 31 includes a generally rectangular frame having an upper frame portion 32 and a lower frame portion 34. The portions 32 and 34 are rigidly interconnected by vertically disposed side frame portions 36 and 38.

Figure 2:
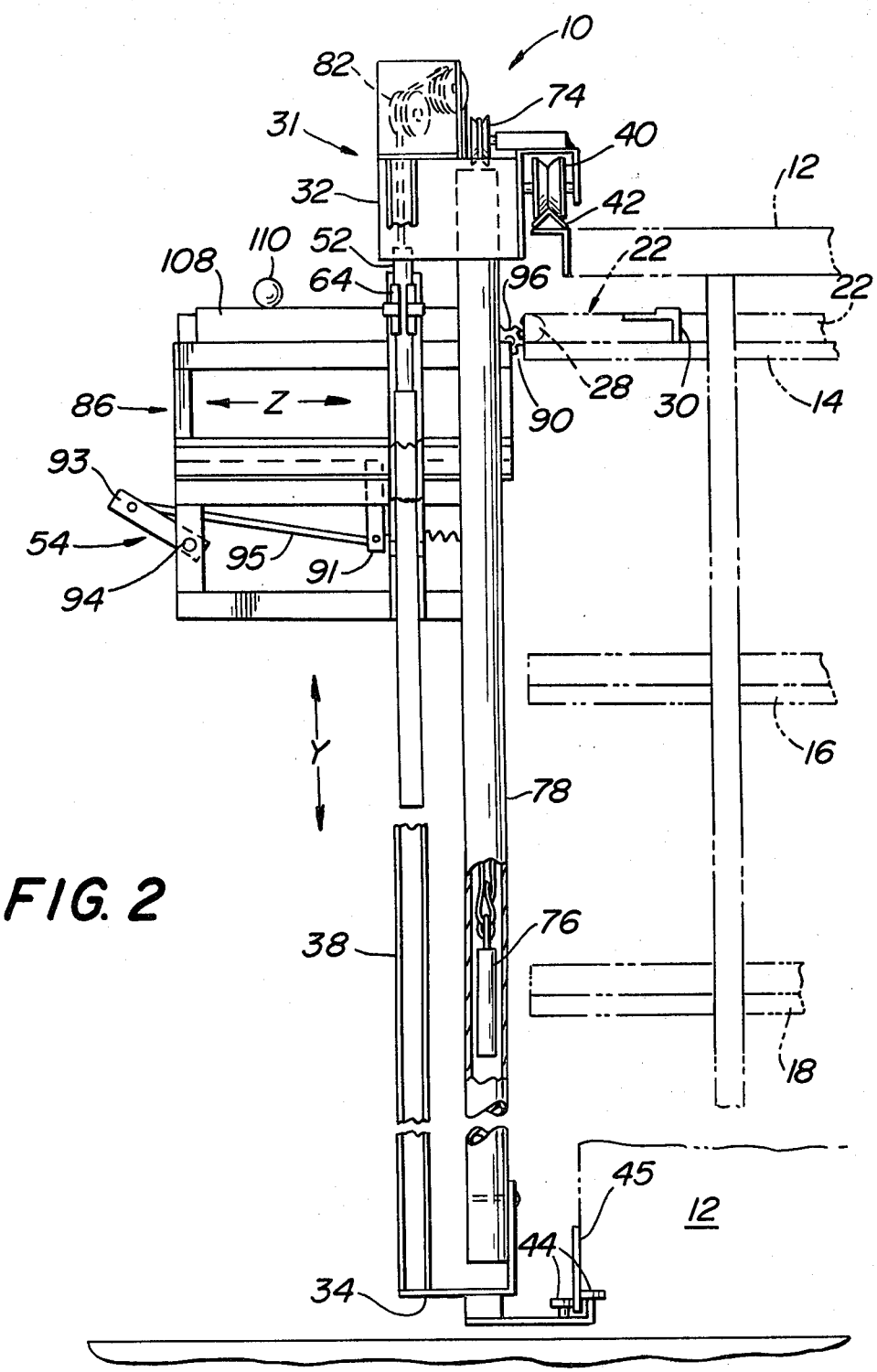
FIG. 2 is a right side view of the apparatus shown in FIG. 1.

A pair of support wheels 40 are supported in any convenient manner by the upper frame portion 32. See FIGS. 2 and 3. Wheels 40 ride on a track 42 supported by the shelf frame 12. Wheels 44 are supported by the lower frame portion 34 and are guided by opposite sides of track 45. Track 45 may be vertically disposed as shown in FIG. 2 and is supported by the shelf frame 12. Thus, the lane loading apparatus 31 is supported by the shelf frame 12 for horizontal movement in a first direction parallel to the loading end of the shelves. See arrow X.

Figure 4:
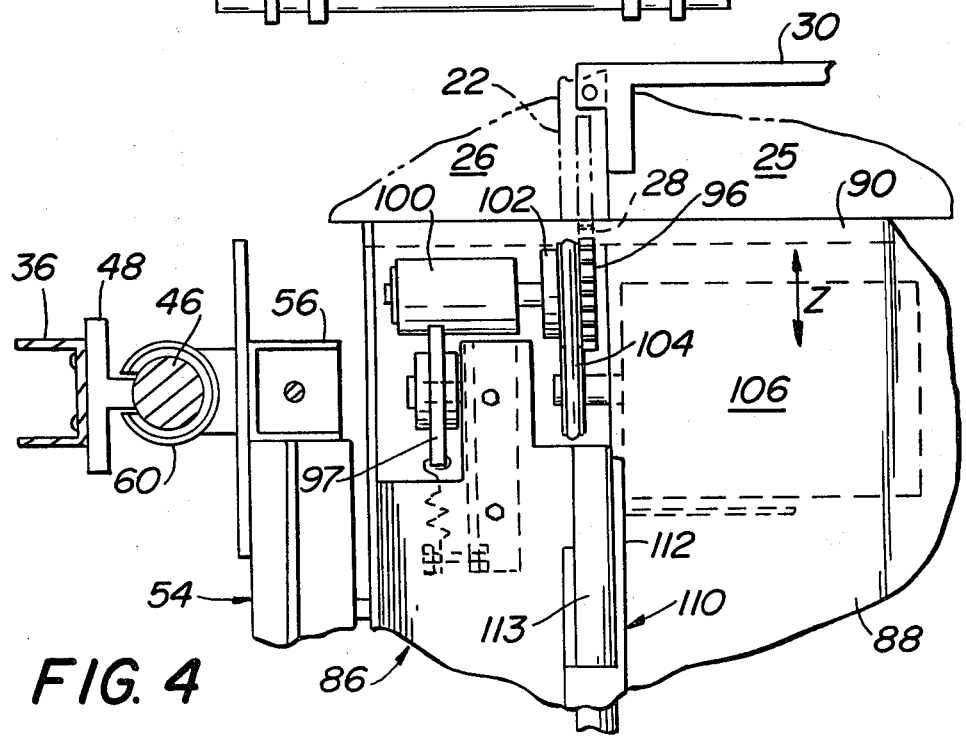
FIG. 4 is a sectional view taken along the line 4—4 in FIG. 1 but on an enlarged scale.

Between and supported by the side frame portions 34, 38, there is provided a pair of vertically disposed guide tubes. A first guide shaft 46 is connected by a T-shaped bar 48 to the side frame portion 36. See FIGS. 1 and 4. Shaft 46 is fixedly secured to one of the legs of the T bar 48. A similar guide shaft 50 is connected to the side frame portion 38 by a T bar 52. Guide shaft 46 is closer to the loading end of the shelves as compared with the guide shaft 50.

Figure 6:
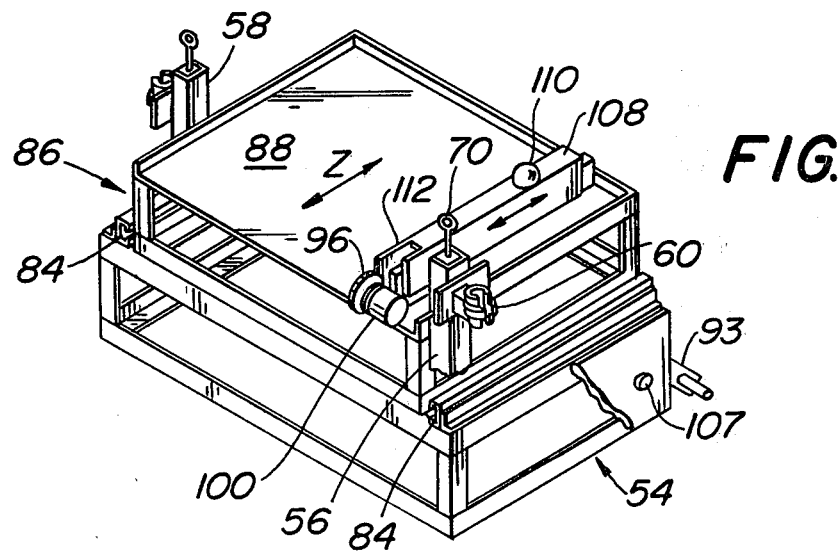
FIG. 6 is a perspective view of the main carriage and auxiliary carriage.

A main carriage 54, preferably rectangular in construction, is guided for vertical movement by the shafts 46, 50. See arrow Y. Carriage 54 has a pair of vertically disposed posts 56, 58 on opposite sides thereof. See FIG. 6. Post 56 is positioned so as to be juxtaposed to the shaft 46 while post 58 is positioned so as to be juxtaposed to the shaft 50. Post 58 fixedly supports a C-shaped sleeve 60 which embraces the shaft 46. A second C-shaped sleeve 62 is supported by the carriage 54 and embraces the shaft 46 at an elevation below the elevation of sleeve 60. See FIGS. 1 and 4. A C-shaped sleeve 64 is mounted on post 58 in a similar manner and embraces the guide shaft 50. A C-shaped sleeve 66 on the opposite side of the carriage 54 from lower sleeve 62 also embraces the guide shaft 50. Thus, the carriage 54 is guided for vertical movement at four locations by the sleeves 60, 62, 64 and 66 for improved stability of vertical movement with reliability in terms of preventing cocking or jamming of the carriage with respect to its vertical guides. The C-shaped sleeves may be commercially available low friction ball bushings.

A first cable or equivalent device 68 has one end secured to a ring 70 on the post 56. See FIGS. 1 and 6. Cable 68 extends upwardly around pulleys 72, 74 on the upper frame portion 32 and then extends downwardly to a counterweight 76 located within the vertically disposed tube 78. Tube 78 is supported by the lane loader frame in a location adjacent to and parallel to the guide tube 50. See FIGS. 2 and 3. A cable 80 has one end fixedly secured to a ring on the post 58 and extends around pulleys 82. Cable 80 extends into the tube 78 and is also attached to the counterweight 76. Thus, the carriage 54 will be maintained at any preset elevation in alignment with any one of the shelves 14, 16 and 18. Adjustment of the vertical position of carriage 54 is manual.

A track 84 is provided on the main carriage 54 along opposite side edges thereof. Tracks 84 extend toward the shelves. See FIG. 6. An auxiliary carriage 86 is supported by the main carriage 54. Carriage 86 has wheels rotatably supported by the tracks 84. See FIG. 1. Tracks 84 guide the auxiliary carriage 86 for movement toward and away from the shelves. Thus, the auxiliary carriage 86 may reciprocate in the direction of arrow Z which is perpendicular to the direction of arrows X and Y so that the carriage 86 may close the gap 90 between the lane loading apparatus 31 and the loading end of the shelves 14, 16 and 18. See FIGS. 2, 4 and 5.

The auxiliary carriage 86 has a pair of actuators 91 fixedly secured thereto and depending downwardly therefrom into the main carriage 54. Main carriage 54 has a U-shaped handle 93 pivotably secured thereto for pivotable movement about the axis of pins 94. See FIGS. 1, 2 and 5. Handle 93 has a cross bar connected by a pair of connecting members 95 to the actuator 91. Pivotable movement of handle 93 upwardly in FIG. 5 will pull the auxiliary carriage 86 to a position away from the loading end of the shelves to thereby open the gap 90. Handle 93 is then in an over-the-center locked position. Carriage 86 is biased toward the shelves in any convenient manner such as by the spring 92 having one end fixed to the carriage 54 and one end fixed to at least one of the actuators 91. Articles to be transferred from the auxiliary carriage 86 to the shelf 14 are supported by a horizontally disposed plate member 88 having an upstanding peripheral flange on three sides thereof as shown more clearly in FIG. 6.

Figure 5:
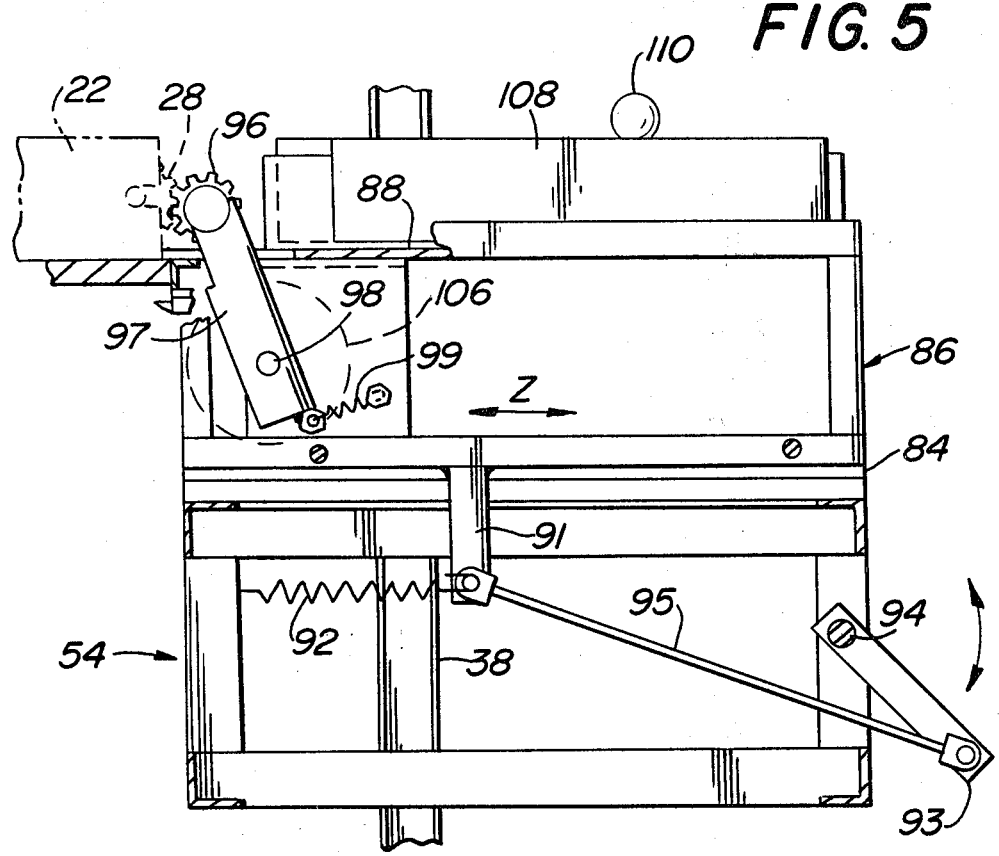
FIG. 5 is a sectional view taken along the line 5—5 in FIG. 1 but on an enlarged scale.

A lane actuator 96 is supported by the auxiliary carriage 86. See FIGS. 4 and 6. Actuator 96 is preferably in the form of a sprocket adapted to mesh with the sprocket 98 as shown in FIG. 5. The sprocket 96 has a bearing 100 and a pulley 102 coaxial therewith. See FIG. 4. Bearing 100 is supported at one end of a lever 97. See FIGS. 4 and 5. Lever 97 is pivotable about a pin 98 intermediate its ends. Lever 97 is biased to the position shown in FIG. 5 by a spring 99 which acts as a shock absorber.

A motor 106 is supported by one of the carriages 54, 86. As shown, motor 106 is supported by carriage 86. A belt 104 extends between the pulley 102 and the pulley on the output shaft of motor 106. Hence, motor 106 rotates the sprocket 96 to thereby drive the sprocket 28 to a reloading position. Flexible electrical conduits for coupling electricity to the motor 96 are not shown. A switch button 107 is supported by the carriage 54 for controlling the motor 106.

In order to maintain the mesh of sprockets 28 and 96 without permitting articles to contact the same, the carriage 86 is preferably provided with a reciprocal guard 108. Guard 108 has a cut-out slot in its top wall but includes a vertically disposed side wall 112 which can be moved from the inoperative position shown in FIGS. 4 and 6 to a position wherein it is disposed alongside the sprockets 28, 96 to prevent contact between articles and such sprockets. Reciprocation of the guard 108 may be attained in any convenient manner such as by the handle 110. Guard 108 has the same cross-sectional shape and dimensions as lane divider 22. Guard 108 is guided by track 113.

OPERATION

The lane loading apparatus 31 is utilized as follows. Apparatus 31 is manually pushed in a first horizontal direction as indicated by the arrow X in FIG. 3 to a desired lane such as the location of lane 25 on shelf 14. The carriages 54, 86 are manually elevated in the direction of arrow Y to the elevation of the selected shelf such as the elevation of shelf 14. Handle 93 is moved downwardly from the position shown in FIG. 2 to the position shown in FIG. 5 to thereby enable spring 92 to cause the auxiliary carriage 86 to move from right to left in FIG. 5 and thereby close the gap 90. With gap 90 closed, articles to be reloaded cannot fall through such gap. The leading edge of plate member 88 overlies an edge portion of shelf 14 as shown in FIG. 5.

As the auxiliary carriage 86 moves from right to left in FIG. 5, sprocket 96 meshes with sprocket 28 and thereafter lever 97 pivots about pin 98 so as to prevent damage to either of the sprockets. At this point in time, the spring 92 is relaxed and spring 95 has been stretched. Guard 108 is shifted into contact with the end of lane divider 22.

The switch button 107 is pushed to thereby cause motor 106 to drive sprocket 96. Sprocket 96 drives sprocket 28 to thereby retract the pusher 30 to a lane loading position. Pusher 30 is preferably pivotable out of the way in its lane loading position. Thereafter, articles are placed onto the plate member 88 and pushed off the front edge of plate member 88 into the lane 25 on shelf 14. When the lane 25 has been reloaded, the pusher 24 is pivoted to an operative position. Handle 93 is raised to the position shown in FIG. 2 to thereby return the auxiliary carriage 86 to the position wherein gap 90 is open and spring 92 is tensioned. Thereafter, the guard 108 may be retracted to the position shown in FIGS. 4–6. The process is then repeated in connection with the reloading of any of the other lanes on any of the shelves.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for loading articles into lanes on horizontal shelves comprising a loading frame mounted on wheels to permit the frame to move horizontally in a first direction, a main carriage supported by said frame for vertical movement, an auxiliary carriage supported by said main carriage for horizontal movement relative thereto in a second direction between operative and inoperative positions, said second direction being perpendicular to said first direction, a horizontal plate member supported by said auxiliary carriage and adapted to bridge a gap between said auxiliary carriage and a shelf in the operative position of the auxiliary carriage, a lane actuator supported by said auxiliary carriage and being adapted to drive an endless member connected to a pusher in a shelf lane to a reloading position, motor means on said auxiliary carriage for driving said lane actuator, whereby articles may be reloaded onto a shelf lane from said plate member when said auxiliary carriage is in its operative position.

2. Apparatus in accordance with claim 1 wherein said lane actuator includes a sprocket supported by one end of a pivotable lever, and a shock absorber coupling said lever to said auxiliary carriage.

3. Apparatus in accordance with claim 1 wherein said loading frame has a first set of wheels at the upper end thereof for rotation about a horizontal axis and a second set of wheels at the lower end thereof for rotation about a vertical axis, the wheels at the upper end of the loading frame being support wheels, the wheels at the lower end of the loading frame being guide wheels.

4. Apparatus in accordance with claim 1 wherein said loading frame includes a pair of vertically disposed guide shafts, said carriages being between said guide tubes, a pair of C-shaped bearings on opposite sides of said main carriage, each bearing embracing one of said shafts.

5. Apparatus in accordance with claim 1 including a movable means mounted on said main carriage for causing said auxiliary carriage to move in said second direction.

6. Apparatus for loading articles into lanes on horizontal shelves comprising a loading frame, a main carriage supported by said frame for vertical movement, an auxiliary carriage supported by said main carriage for horizontal movement relative to the main carriage, means extending between said carriages to cause movement of the auxiliary carriage from an inoperative position to an operative position, means at least partially connected to the main carriage for retracting the auxiliary carriage to an inoperative position, a horizontally disposed plate member on said auxiliary carriage for supporting articles to be transferred onto a shelf, a lane actuator supported by the auxiliary carriage, motor means on one of said carriages for driving said lane actuator, and said lane actuator being adapted to cooperate with structure on a shelf for retracting a lane pusher to a reloading position.

7. Apparatus in accordance with claim 6 including support wheels at the upper end of said frame and guide wheels at the lower end of said frame to facilitate horizontal movement of the frame in a direction perpendicular to the horizontal direction of movement of the auxiliary frame.

8. Apparatus in accordance with claim 6 wherein said lane actuator is a sprocket, a guard on said auxiliary carriage for preventing contact between said sprocket and articles to be transferred from the plate member to a shelf.

9. Apparatus in accordance with claim 6 wherein said auxiliary carriage is spring biased to its operative position, and said means extending between the carriages being a handle pivoted to said main carriage for cooperation with an actuator depending from said auxiliary carriage.

10. Apparatus for loading articles into lanes on horizontal shelves comprising a loading frame, a main carriage supported by said frame for vertical movement, an auxiliary carriage supported by said main carriage for horizontal movement relative to the main carriage, support wheels at the upper end of said frame and guide wheels at the lower end of said frame to facilitate horizontal movement of the frame in a direction perpendicular to the horizontal direction of movement of the auxiliary frame, means extending between said carriages to cause movement of the auxiliary carriage from an operative position to an inoperative position, said auxiliary carriage being spring biased to its operative position, said means extending between the carriages being pivoted to said main carriage for cooperation with an actuator depending from said auxiliary carriage, a horizontally disposed plate member on said auxiliary carriage for supporting articles to be transferred onto a shelf, a lane actuator supported by the auxiliary carriage, motor means on one of said carriages for driving said lane actuator, said lane actuator being adapted to cooperate with structure on a shelf for retracting a lane pusher to a reloading position, and a movable guard on said auxiliary carriage for preventing contact between said lane actuator and articles to be transferred from the plate member to a shelf.

* * * * *